(12) United States Patent
Freymuth et al.

(10) Patent No.: US 10,787,851 B2
(45) Date of Patent: Sep. 29, 2020

(54) WINDOW REGULATOR ASSEMBLY HAVING SNAP-TOGETHER GUIDE ELEMENTS FOR A FLUSH-MOUNT PANE DESIGN, AND ASSEMBLY METHOD

(71) Applicant: BROSE FAHRZEUGTEILE GMBH & CO. KOMMANDITGESELLSCHAFT, BAMBERG, Bamberg (DE)

(72) Inventors: Ian Freymuth, Sant Pere de Ribes/Rocamar (ES); Matthias Heppner, Burgkunstadt (DE); Manuel Griesmann, Stoetten am Auerberg (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 16 days.

(21) Appl. No.: 15/774,987

(22) PCT Filed: Nov. 9, 2016

(86) PCT No.: PCT/EP2016/077056
§ 371 (c)(1),
(2) Date: May 9, 2018

(87) PCT Pub. No.: WO2017/081041
PCT Pub. Date: May 18, 2017

(65) Prior Publication Data
US 2018/0371814 A1    Dec. 27, 2018

(30) Foreign Application Priority Data
Nov. 13, 2015    (DE) .................... 10 2015 222 472

(51) Int. Cl.
*E05D 15/16*    (2006.01)
*B60J 1/17*    (2006.01)
*B60J 10/79*    (2016.01)

(52) U.S. Cl.
CPC .............. *E05D 15/165* (2013.01); *B60J 1/17* (2013.01); *B60J 10/79* (2016.02); *E05Y 2900/55* (2013.01)

(58) Field of Classification Search
CPC ........... E05D 15/165; B60J 10/79; B60J 1/17; E05Y 2900/55
(Continued)

(56) References Cited

U.S. PATENT DOCUMENTS 4,240,227 A    12/1980  Hasler et al.
4,490,942 A *  1/1985  Arnheim ................ B60J 10/24
                                                                49/374
(Continued)

FOREIGN PATENT DOCUMENTS

CN    1791728 A    6/2006
CN    105246723 A  1/2016
(Continued)

OTHER PUBLICATIONS

CN First Office action dated May 8, 2019 issued in Chinese corresponding Application No. 201780007613, 10 pages, with English translation, 5 pages.
(Continued)

*Primary Examiner* — Jerry E Redman
(74) *Attorney, Agent, or Firm* — Lewis Roca Rothgerber Christie LLP

(57) ABSTRACT

A window regulator assembly includes a window pane which is adjustable along an adjustment path and which extends along a plane, wherein the window pane in a closed state is flush-mounted relative to at least one of upper or
(Continued)

lateral bodywork parts which border a window opening to be closed by the window pane. The window regulator assembly also includes at least one first guide element which is fixed to the window pane in the region of a lateral edge of the window pane, and at least one second guide element on which the first guide element is displaceably held along the adjustment path of the window pane wherein the first or second guide element may include at least one resiliently displaceable latching portion.

22 Claims, 10 Drawing Sheets

(58) Field of Classification Search
USPC .................................................. 49/440, 441
See application file for complete search history.

(56) References Cited

U.S. PATENT DOCUMENTS

| | | | |
|---|---|---|---|
| 4,567,691 | A | 2/1986 | Warner |
| 4,604,830 | A | 8/1986 | Maeda et al. |
| 4,608,779 | A | 9/1986 | Maeda et al. |
| 4,611,435 | A | 9/1986 | Warner |
| 4,662,115 | A | 5/1987 | Ohya et al. |
| 4,744,174 | A | 5/1988 | Mesnel et al. |
| 4,874,201 | A | 10/1989 | Scaglietti |
| 4,920,697 | A | 5/1990 | Vail et al. |
| 4,969,293 | A | 11/1990 | Guillon |
| 5,036,621 | A | 8/1991 | Iwasaki |
| 5,040,333 | A | 8/1991 | Mesnel et al. |
| 5,159,781 | A * | 11/1992 | Glossop, Jr. ............... B60J 1/17 49/375 |
| 5,613,325 | A * | 3/1997 | Mariel .............. B32B 17/10036 49/374 |
| 5,729,930 | A | 3/1998 | Buehler et al. |
| 5,732,509 | A | 3/1998 | Buehler et al. |
| 5,864,987 | A | 2/1999 | Mariel et al. |
| 6,141,910 | A | 11/2000 | Kobrehel et al. |
| 6,966,149 | B2 | 11/2005 | Fenelon |
| 7,854,094 | B2 * | 12/2010 | Zimmer ..................... B60J 1/08 49/374 |
| 8,650,802 | B2 | 2/2014 | Grudzinski et al. |
| 10,167,659 | B2 * | 1/2019 | Sagisaka .................... B60J 1/17 |
| 2004/0083654 | A1 | 5/2004 | Yamamoto et al. |
| 2006/0021282 | A1 * | 2/2006 | Tamaoki ................. B60J 10/74 49/441 |
| 2006/0037249 | A1 | 2/2006 | Kawamura |
| 2007/0261313 | A1 | 11/2007 | Ruppert et al. |
| 2009/0309391 | A1 * | 12/2009 | Krause .................... B60J 10/79 296/201 |
| 2012/0025564 | A1 | 2/2012 | Ellis et al. |
| 2013/0061526 | A1 | 3/2013 | Grudzinski et al. |
| 2013/0276372 | A1 | 10/2013 | Lopez et al. |

FOREIGN PATENT DOCUMENTS

| | | |
|---|---|---|
| DE | 2551450 A1 | 5/1977 |
| DE | 3500791 A1 | 7/1985 |
| DE | 4026215 A1 | 2/1992 |
| DE | 4437532 A1 | 4/1996 |
| DE | 19744810 A1 | 4/1999 |
| DE | 19826040 A1 | 9/1999 |
| DE | 19962988 A1 | 5/2000 |
| DE | 10254989 A1 | 6/2004 |
| DE | 102005052945 B3 | 4/2007 |
| DE | 20 2011 050 329 U1 | 10/2012 |
| DE | 10 2012 214 508 A1 | 3/2013 |
| EP | 0021069 B1 | 1/1981 |
| EP | 0068367 B1 | 1/1983 |
| EP | 0087879 B1 | 9/1983 |
| EP | 0354 082 A1 | 2/1990 |
| EP | 0369798 B1 | 5/1990 |
| EP | 0479 522 B1 | 4/1992 |
| EP | 0 512 673 B1 | 11/1992 |
| EP | 1 794 402 B1 | 6/2007 |
| EP | 1816017 A | 8/2007 |
| EP | 2 142 394 | 1/2010 |
| FR | 2 604 660 A1 | 4/1988 |
| FR | 2747345 A1 | 10/1997 |
| FR | 3021254 A1 | 11/2015 |
| GB | 1536909 | 12/1978 |
| GB | 2 316 431 A | 2/1998 |
| JP | 59-199319 | 11/1984 |
| JP | S59206220 A | 11/1984 |
| JP | 61-169317 | 7/1986 |
| JP | 63-15218 | 2/1988 |
| JP | 10-61308 | 3/1998 |
| JP | 2000-38875 A | 2/2000 |
| JP | 2004036211 A | 2/2004 |
| JP | 2008-149849 A | 7/2008 |
| JP | 2014-234040 | 12/2014 |
| JP | 2016-048017 A | 4/2016 |
| WO | WO 2008/055982 A1 | 5/2008 |
| WO | WO 2014/191812 A1 | 12/2014 |

OTHER PUBLICATIONS

Japanese Notification of Reasons for Rejection dated Oct. 15, 2019 issued in corresponding JP Application No. 2018-557198, 7 pages, with English translation, 6 pages.

European Examination Report dated Sep. 11, 2019 issued in corresponding EP Application No. 17 701 442.0-1005, 5 pages, with English translation, 2 pages.

Japanese Notification of Reasons for Rejection dated Jul. 2, 2019 issued in corresponding JP Application No. 2018-524470, 5 pages, with English translation, 4 pages.

Japanese Notification of Reasons for Rejection dated Jul. 30, 2019 issued in corresponding JP Application No. 2018-536864, 5 pages, with English translation, 4 pages.

* cited by examiner

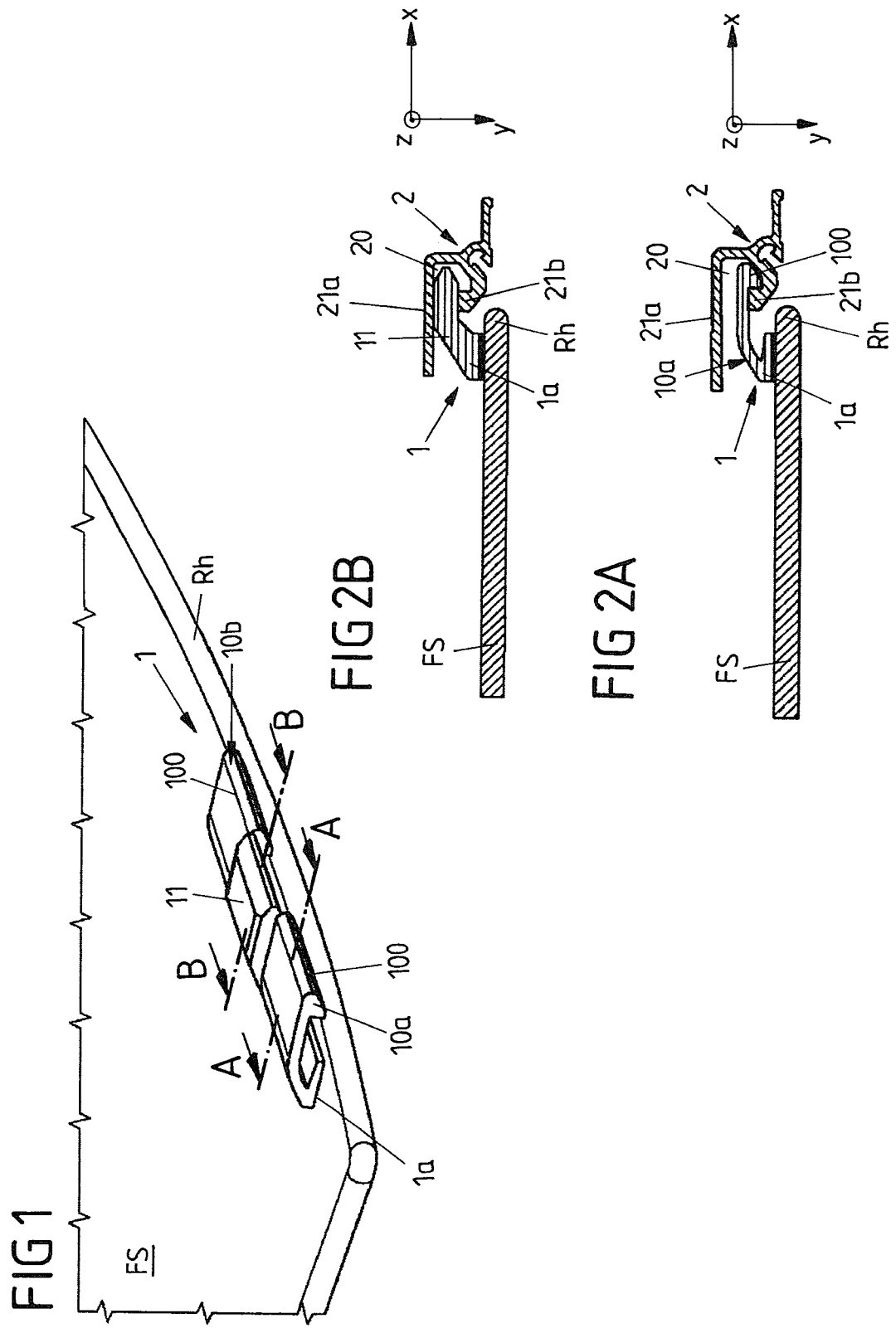

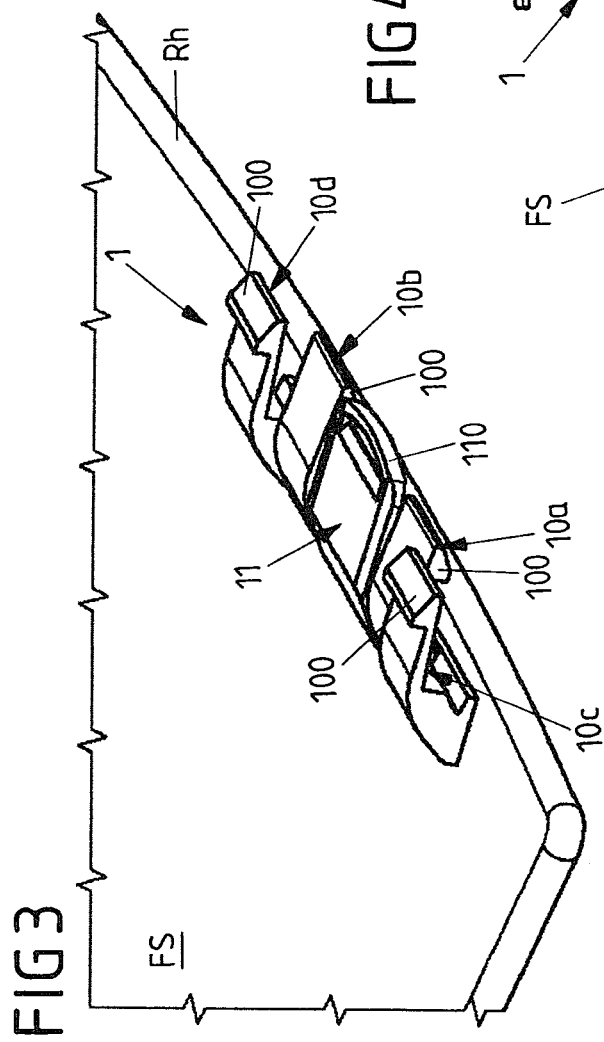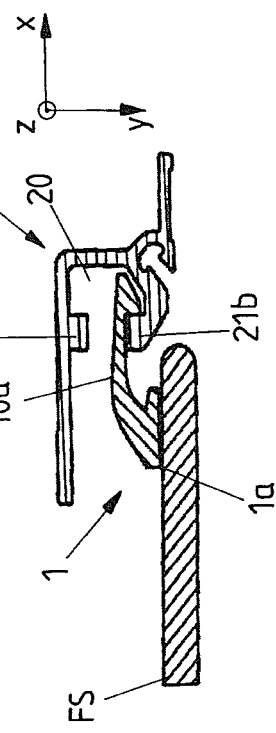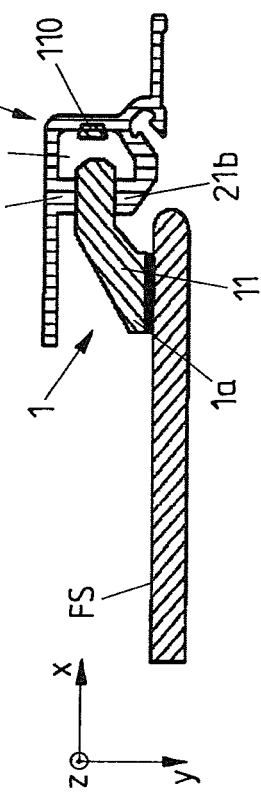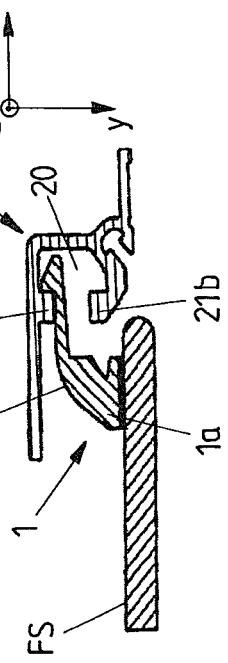

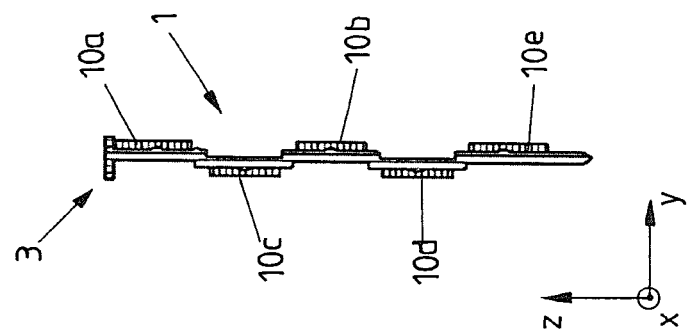
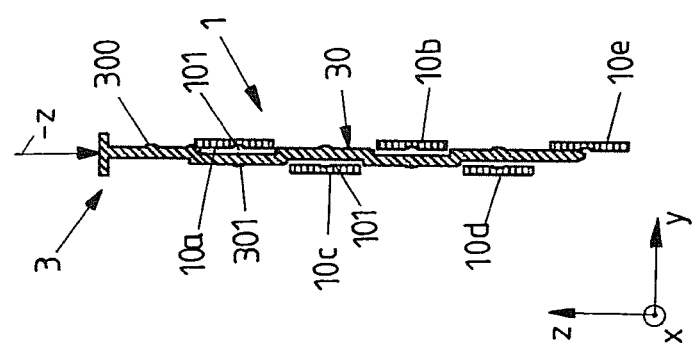
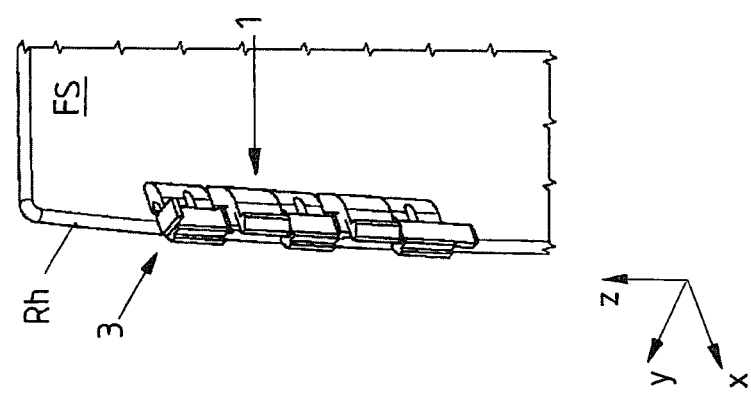
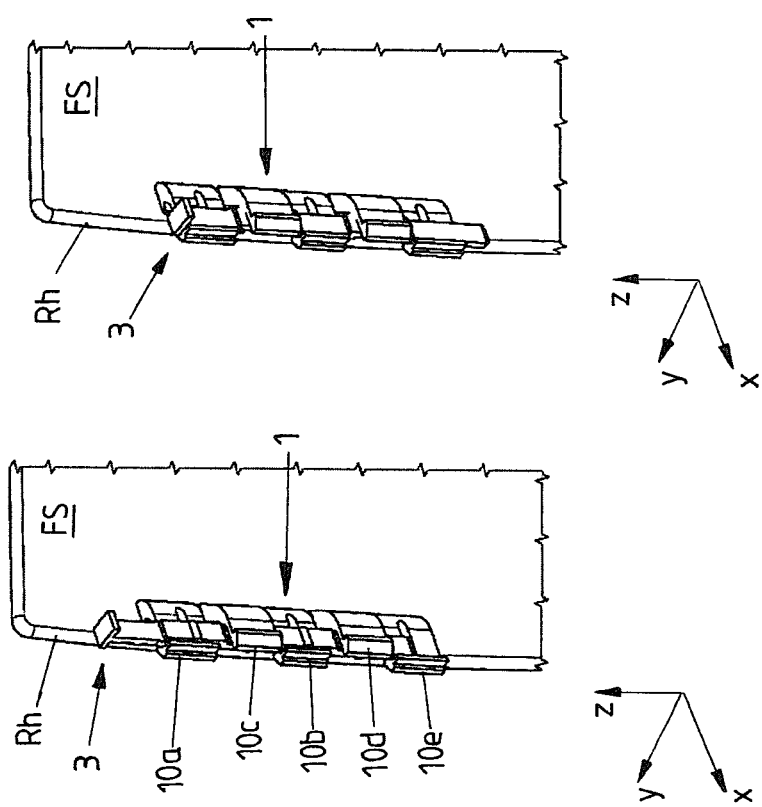

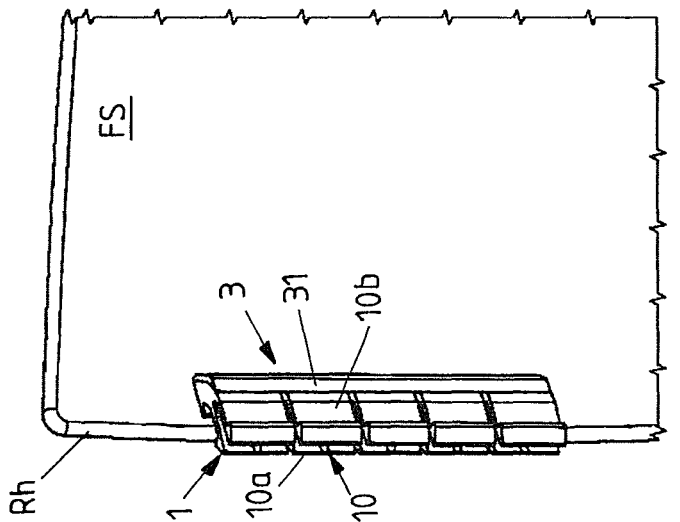
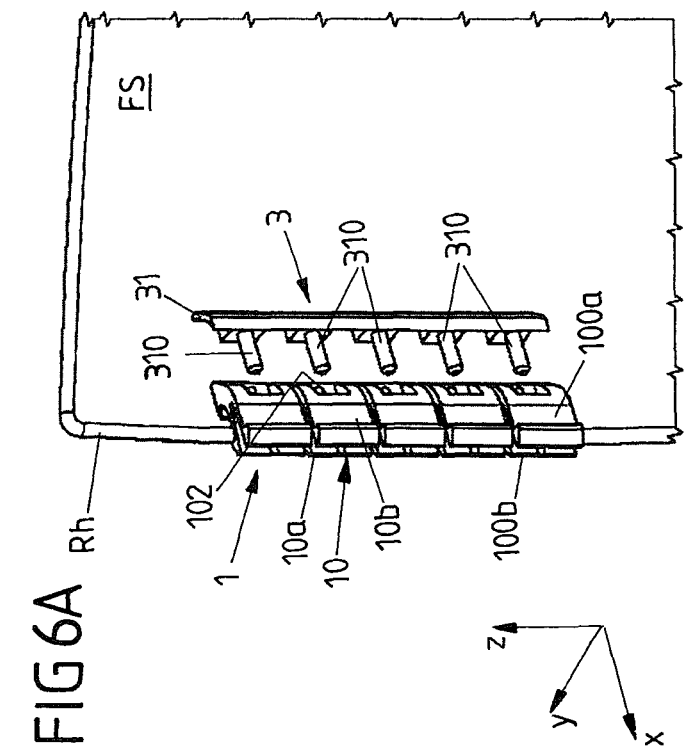
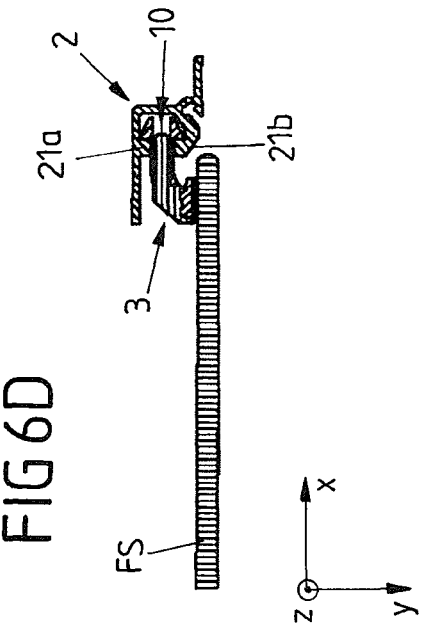
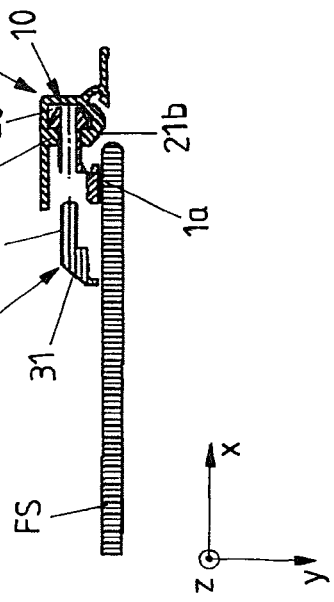

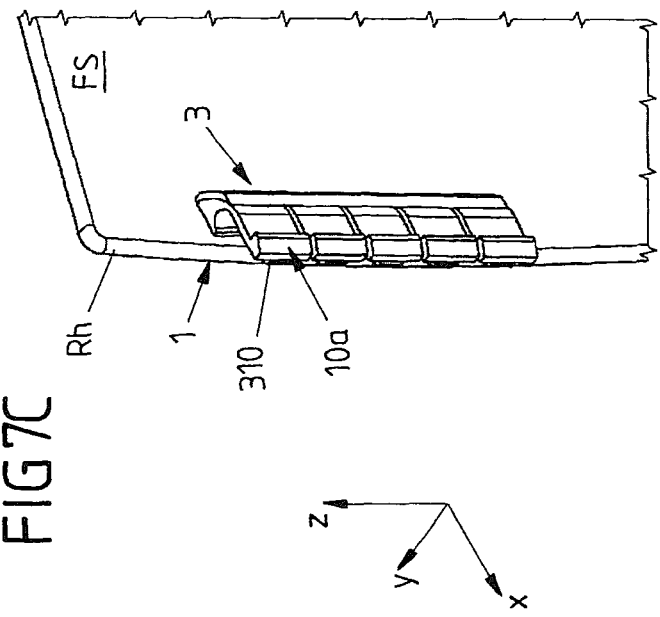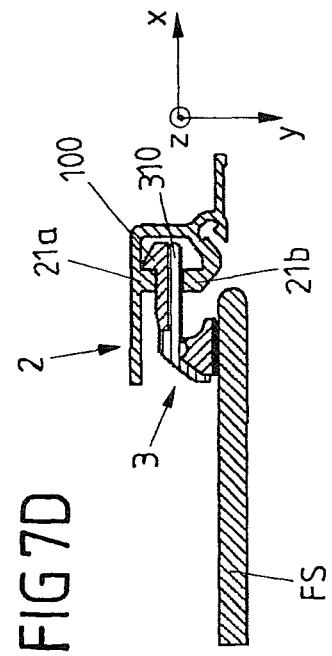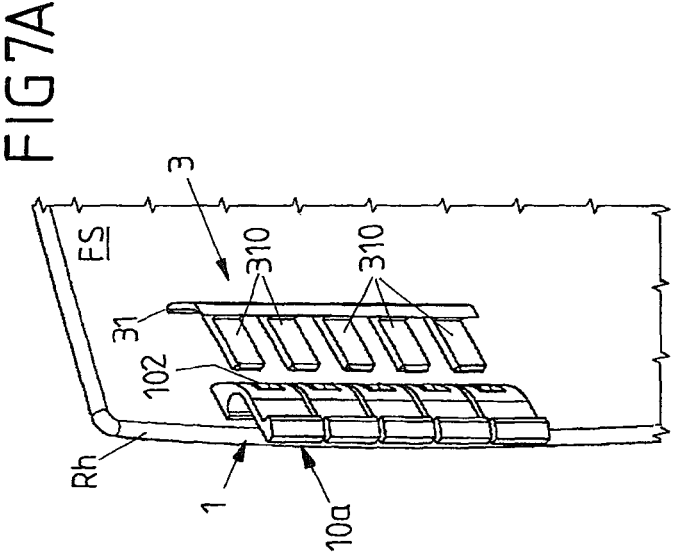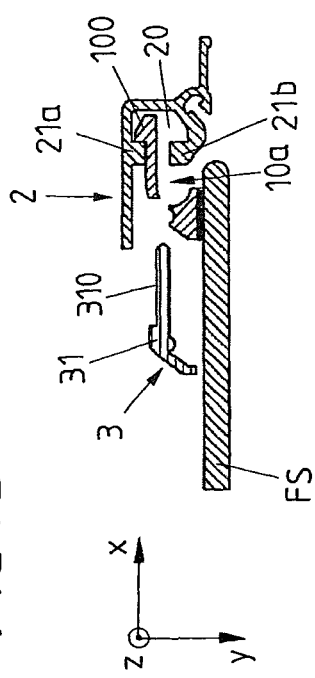

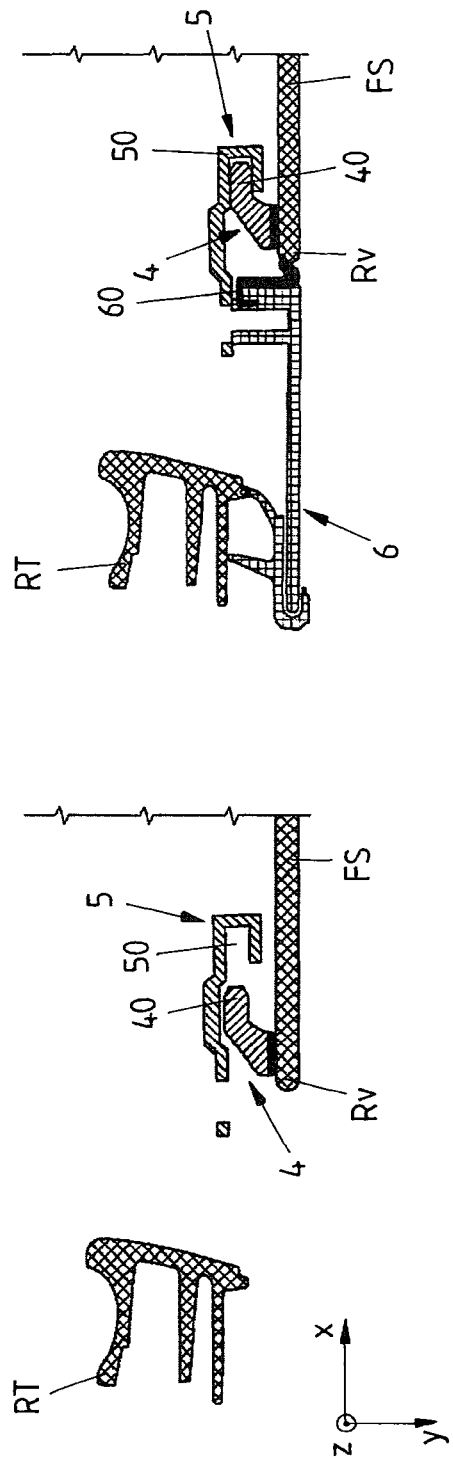
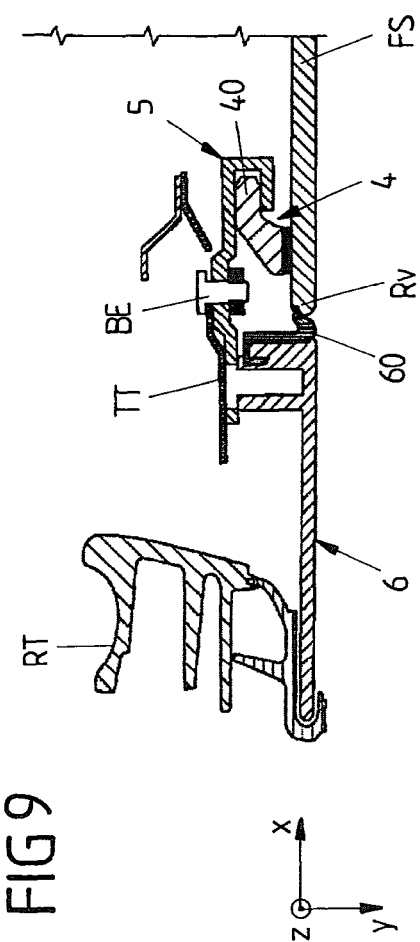

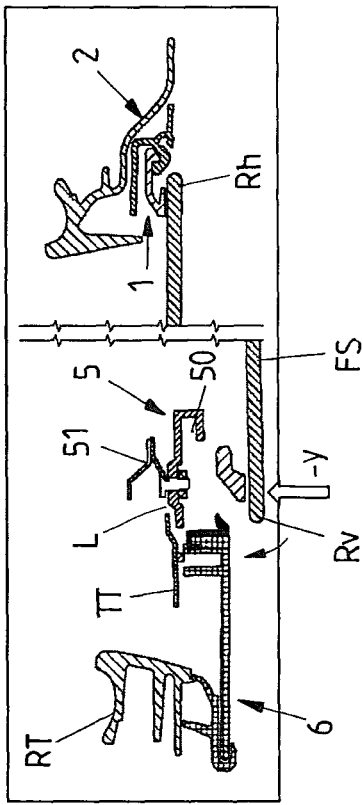
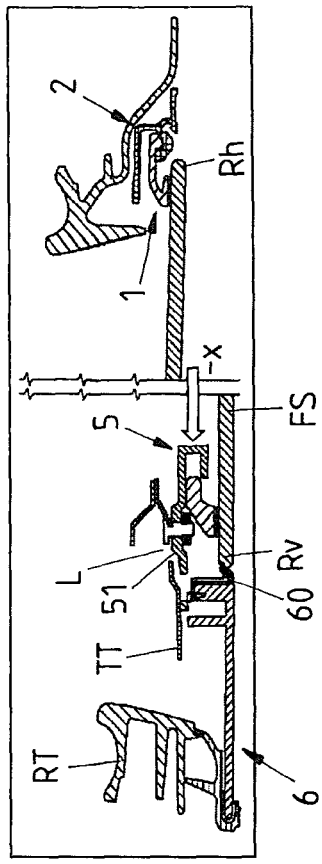
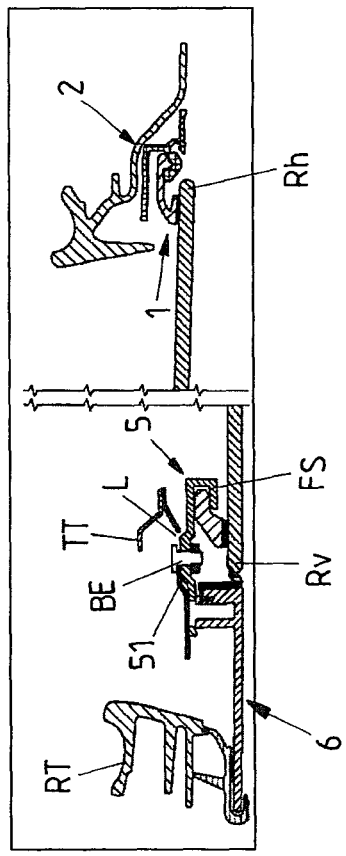

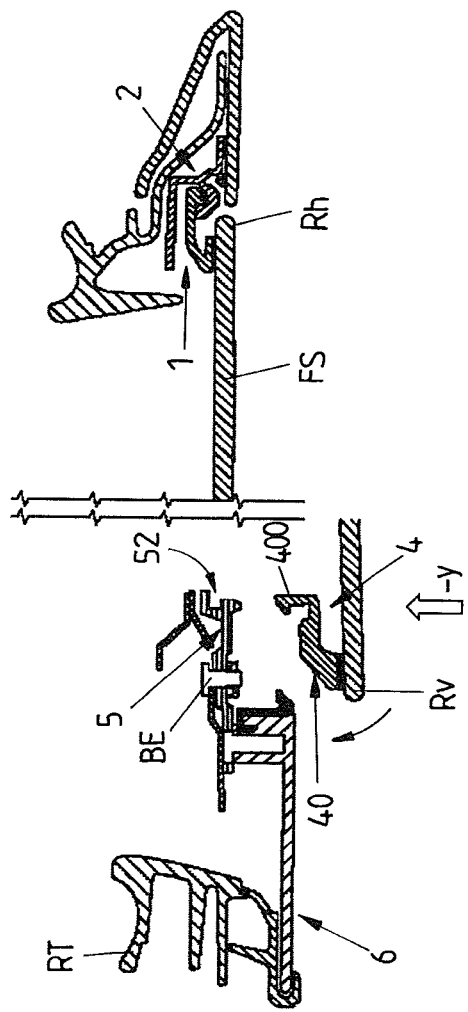
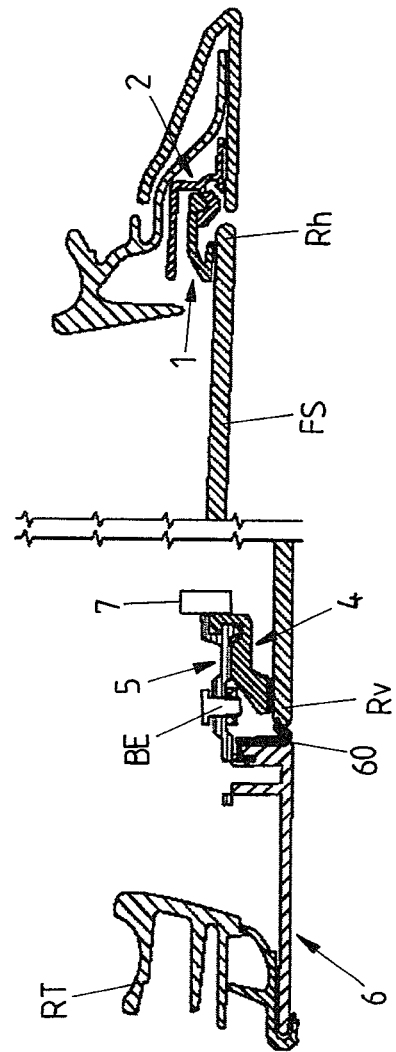
FIG 11A
FIG 11B

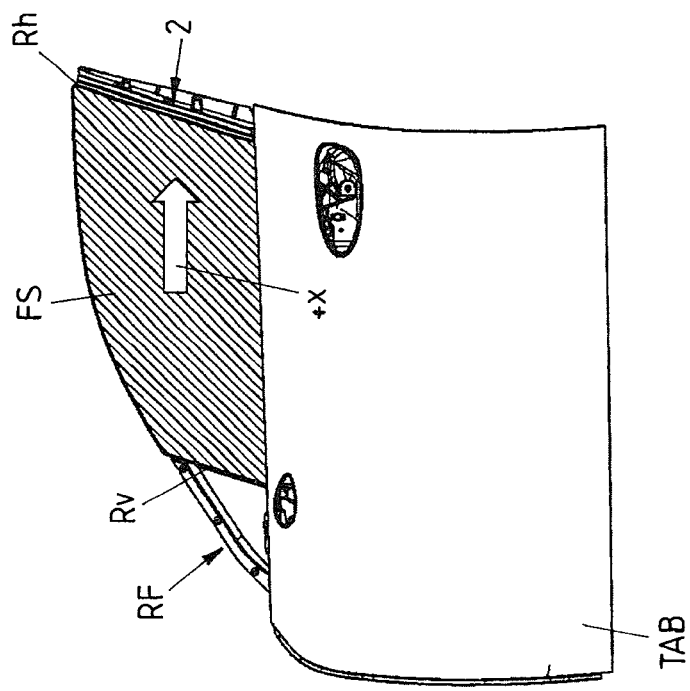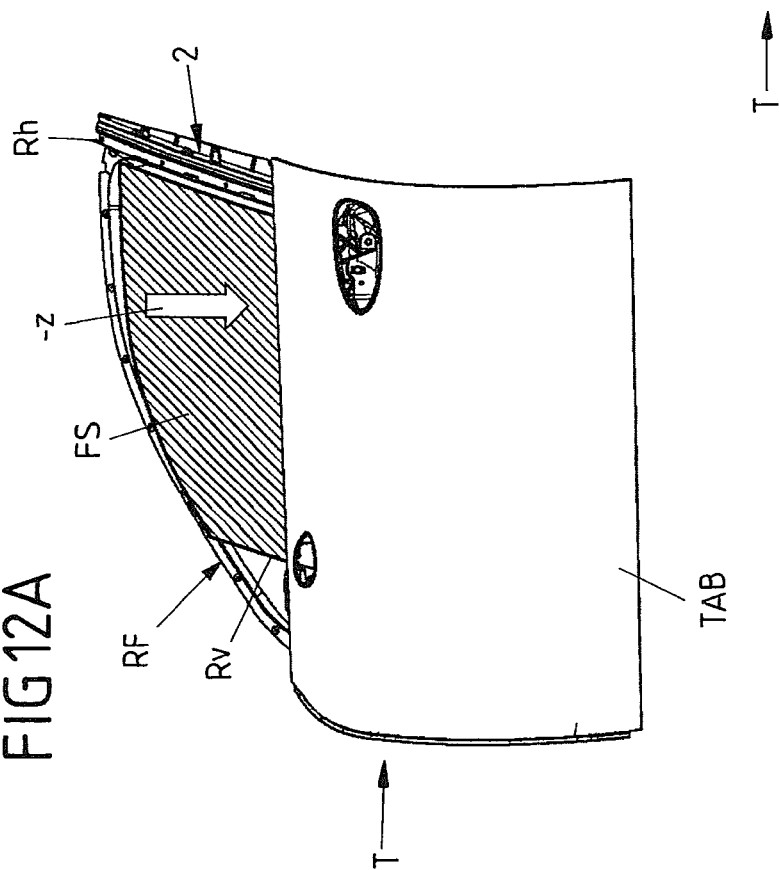

WINDOW REGULATOR ASSEMBLY HAVING SNAP-TOGETHER GUIDE ELEMENTS FOR A FLUSH-MOUNT PANE DESIGN, AND ASSEMBLY METHOD

CROSS-REFERENCE TO A RELATED APPLICATION

This application is a National Phase Patent Application of International Patent Application Number PCT/EP2016/077056, filed on Nov. 9, 2016, which claims priority of German Patent Application Number 10 2015 222 472.4, filed on Nov. 13, 2015, the entire contents of all of which are incorporated herein by reference.

BACKGROUND

The invention relates to a window regulator assembly and a method for the assembly of a window regulator assembly.

Window regulator assemblies comprising a window pane which is adjustable along an adjustment path and which extends along an (optionally curved) plane of the pane are extensively known for vehicle window regulators. In this case, in a closed state, a window opening inside a vehicle door or, in the case of a rear side pane, a window opening on the bodywork side, is closed via the window pane. In recent years, at least in luxury vehicles, so-called flush-mount pane designs ("flush glass" or "flush glazing") have enjoyed increasing popularity. In this case, the window pane in its closed position is flush-mounted relative to the upper and/or lateral bodywork parts which border a window opening to be closed by the window pane. The window pane, therefore, when it is fully closed is not set back relative to the bodywork parts surrounding the window pane, when viewed on its outer face. Instead, the impression of a continuously extending flat pane and bodywork surface is produced on the vehicle side. By way of example, such a flush-mount pane design is implemented in the Porsche Panamera.

For guiding the window pane, in such pane designs a guide element is fixed to a front and rear lateral edge of the window pane. Such a guide element is then in each case displaceably guided along the adjustment path on a different guide element on the bodywork side or door side, which is generally configured as a guide profile. The guide elements fixed to the window pane are in this case regularly denoted as "pin guides". The assembly of such a window pane, however, was hitherto relatively complex. Thus the pane regularly had to be inserted from below into a guide channel of a guide profile on the bodywork side or door side, i.e. for example from below a window parapet of a vehicle door. However, such an assembly thus also requires a specific door design in which either a door outer skin is retrospectively assembled or a door frame module which is able to be assembled complete, consisting of a door carrier, window frame and pane assembled thereon, is provided and is retrospectively connected to the remaining components of the vehicle door, in particular a door inner skin and a door outer skin.

SUMMARY

It is, therefore, the object of the invention to provide a window regulator assembly which permits a simplified assembly in the case of vehicle window regulators for a flush-mount pane design (so-called "flush glass" or "flush glazing" design).

This object is achieved both by window regulator assemblies as described herein and an assembly method as described herein.

According to the invention, amongst other things, a window regulator assembly which has a window pane extending along a plane of the pane and at least one first guide element which is fixed to the window pane in the region of a lateral edge of the window pane, is proposed. This at least one first guide element is displaceably held along the adjustment path of the window pane on a second guide element generally on the bodywork side or door side. For simplified assembly, it is now provided that the first or second guide element comprise at least one resiliently displaceable latching portion which enables the first and second guide elements to be snapped together in a connection direction extending transversely to the adjustment path and substantially parallel to the plane of the pane, wherein a positive connection of the first guide element which is fixed to the window pane and of the second guide element is provided via the at least one latching portion, said connection securing the first guide element to the second guide element relative to the connection direction. The connection direction in which the first and second guide elements are able to be snapped together for the assembly of the window regulator assembly extends relative to an installed state of the window regulator assembly substantially parallel to a vehicle longitudinal direction facing from the vehicle front to the vehicle rear. Via the first and second guide elements which are positively connected together as intended, moreover, a physical guidance of the window pane is provided both in the connection direction and in a transverse direction extending perpendicular thereto.

Due to the first and second guide elements configured according to the invention, the window pane may be easily assembled even from above a window parapet, since in particular an insertion of a first guide element fixed to the window pane into a guide channel of the second guide element from below is not required, but the guide elements may be snapped together in a connection direction facing to the rear or to the front. In this case, initially it is insignificant whether the latching portion which is resiliently displaceable is provided on the first guide element on the pane side or on the second guide element on the bodywork side or door side. Initially, it is only essential that the two guide elements are able to be placed together in the connection direction and latched together, so that a positive (latching) connection is provided, via which the window pane is guided not only in the connection direction but also in the transverse direction extending perpendicular thereto.

A latching portion of a guide element which is snapped into a guide channel of the other guide element, in this case secures the window pane relative to the connection direction and provides a guidance in the connection direction. Via the latching portion or a guide portion which is different therefrom, moreover, a physical guidance is provided in the transverse direction extending perpendicular to the connection direction so that the window pane, in the region of the lateral edge comprising the first guide element, is guided as intended via the first and second guide elements snapped together in the spatial directions extending perpendicular to the adjustment path of the window pane. The second guide element in this case preferably extends in at least one part of the window opening so that the first guide element is displaceably held thereby on the window opening. The snapping of the two guide elements together, therefore, is possible in this case above a window parapet. In principle, therefore, with a use in a vehicle door of a window regulator assembly designed according to the invention, a door design is no longer required in which a door outer skin is able to be assembled retrospectively, i.e. in particular after introducing the window pane. The second guide element on the bodywork side or door side may naturally also extend below the window parapet and thus, for example, into a door channel. Preferably, however, at least one part of the second guide element extends on the window opening and thus above a window parapet.

In one variant, the latching portion is configured with at least one latching hook which engages behind a wall portion of a guide channel when the first and second guide elements are snapped together. The latching portion is prevented from being pulled out of the guide channel via the latching hook engaging behind the wall portion. At the same time, the physical guidance in the connection direction may be provided via the latching hook bearing against the wall portion.

In one development, at least two latching portions are provided on a guide element, a first latching portion thereof forming a latching hook which protrudes in a first direction and a second latching portion thereof forming a latching hook which protrudes in a second direction opposing the first direction. In this manner, at least two latching hooks are able to engage behind two opposing wall portions of a guide channel, so that the stability of the positive latching connection between the two guide elements is increased.

In a variant based thereon, a first and a second latching portion are arranged one above the other in a longitudinal direction extending perpendicular to the connection direction and substantially parallel to the plane of the pane. The two latching portions are spaced apart from one another, therefore, in this longitudinal direction, which generally extends parallel to a vehicle vertical axis facing from the vehicle floor to the vehicle roof, relative to an installed state of the window regulator assembly. In the case of a plurality of first and second latching portions, these latching portions alternate with one another in the longitudinal direction so that the latching hooks thereof alternately latch with the one or other wall portion of a guide channel which is U-shaped in cross section.

In an alternative variant, first and second latching portions are arranged one behind the other in the transverse direction and thus opposite one another. When inserted into a guide channel for snapping the two guide elements together, therefore, in this case the two latching portions arranged one behind the other are initially pressed against one another in a resilient manner before said latching portions snap with their latching hooks onto opposing wall portions of the guide channel when the latching portions have been inserted sufficiently far into the guide channel in the connection direction.

In one variant, the at least one latching portion (in each case) is configured to be L-shaped in cross section. The L-shaped latching portion in this case is, for example, resiliently displaceable relative to a base which is fixed on an inner face of the window pane facing the vehicle interior in the region of the lateral edge of the window pane. Via the base, therefore, the resiliently displaceable latching portion protrudes slightly from the inner face of the window pane and extends substantially parallel to the plane of the pane of the (optionally curved) window pane in the connection direction. In this case, the latching portion may also protrude in the connection direction beyond the lateral edge of the window pane.

In one variant, the first or second guide element has at least one rigid guide portion which protrudes substantially parallel to the connection direction. After the first and second guide elements have been snapped together, this guide portion provides a further positive connection between the first guide element and the second guide element, said connection securing the first guide element to the second guide element relative to the transverse direction. In this manner, via the latching portion a guidance for the window pane is provided in the region of its lateral edge in the connection direction and via the guide portion a guidance for the window pane is provided in the region of its lateral edge in the transverse direction. Thus the resilience of the at least one latching portion, on the one hand, permits a latching of the first and second guide elements but, on the other hand, also permits in the connection direction a compensation of assembly tolerances, setting behavior and temperature-related variable expansion. In this manner, during assembly an alignment and adjustment of the window pane in the connection direction may be permitted via the latching portion. In turn, via the guide portion which is of rigid design, a defined physical guidance is provided independently thereof at least in the transverse direction, so that the window pane is held on the guide on the bodywork side or door side even in the case of greater forces acting inwardly or outwardly in the transverse direction.

For example, a thickness of the guide portion is selected to be greater than a thickness of the latching portion and the associated latching hook, so that whilst the latching portion and the guide portion are able to be inserted into the same guide channel the latching portion is still displaceable transversely to the connection direction when inserted in the guide channel, in order to be latched, whilst the rigid guide portion is received in the guide channel between two opposing wall portions bordering the guide channel virtually without clearance or without clearance relative to the transverse direction. Moreover, it may also be provided that a guide element forms the at least one latching portion and the other guide element forms the at least one guide portion.

In one exemplary embodiment, a latching portion and a guide portion are spaced apart from one another in a longitudinal direction extending perpendicular to the connection direction and substantially parallel to the plane of the pane, and therefore are preferably arranged one above the other. In particular, in this case the latching portion and the guide portion may be arranged successively in the longitudinal direction. In the case of a plurality of latching portions, the guide portion may also be arranged between a plurality of (at least two) latching portions, in particular arranged in series one behind the other.

In one variant, a resilient region is provided on one of the guide elements of the window regulator assembly, wherein via the resilient region the guide element comprising the at least one latching portion is pretensioned relative to the other guide element parallel to the connection direction, i.e. counter to the connection direction or in the connection direction, when the two guide elements are snapped together. Via the resilient region, therefore, a positive latching connection of the first and second guide elements snapped together is assisted, by for example a latching hook of the latching portion being pressed by the pretensioning force of the resilient region against a wall portion which is engaged from behind by the latching hook. The resilient region in this case may, for example, be provided on a guide portion.

In a development based thereon, the resilient region is formed by a spring arc which is formed on a front face of the guide portion located in the connection direction. In the state of the two guide elements connected together as intended, this spring arc is pressed against a base of a guide channel facing a side edge of the window pane, and thus exerts a pretensioning force onto the guide element comprising the latching portion, in order to assist the physical guidance of the window pane via the latching portion and optionally to secure the latching connection additionally from inadvertent release.

For the (additional) securing of a positive connection of the first and second guide elements, in one variant at least one securing element which is placed onto the at least one latching portion is provided. The securing element in this case may be placed onto the at least one latching portion for ensuring the positive connection perpendicular to the connection direction or parallel to the connection direction, so that the two guide elements are prevented thereby from [not] being inadvertently brought out of engagement with one another. The placing or insertion of the securing element perpendicular to the connection direction preferably takes place in an—optionally vertical—longitudinal direction extending substantially parallel to the plane of the pane and preferably on an inner face of the window pane.

Via the securing element placed onto the latching element, in this case a latching hook of the latching portion of the one guide element is prevented from being able to be brought out of engagement with a wall portion of the other guide element. The securing element in this case blocks the resilient displaceability of the latching portion after the guide elements have been snapped together. The securing element is thus first able to be placed retrospectively onto the at least one latching portion or is able to be placed at least retrospectively onto the latching portion in a securing position in which the securing element secures the first and second guide elements against being brought out of engagement.

At least one part of the securing element may be inserted into an insertion opening provided on the latching portion in order to ensure the positive latching connection via the latching portion. By the insertion into an insertion opening provided on the latching portion itself, for example, the securing element in this case is able to stiffen the latching portion retrospectively and thereby prevent the resilient displaceability thereof.

In one variant, a plurality of latching portions are provided spaced apart from one another, for example in the longitudinal direction, an individual securing element being able to be placed thereon at the same time. In one variant, the securing element, for example, forms a rigid pin body which extends between a plurality of latching portions with latching hooks protruding alternately in two different directions and supports these latching hooks against one another in order to hold the latching hooks in engagement with opposing wall portions of a guide channel. In a further variant, the securing element comprises a pin strip with a plurality of securing pins protruding therefrom. Each securing pin is then assigned to an insertion opening of a latching portion. Via the securing element with its pin strip, all securing pins are then attached at the same time to the plurality of latching portions for securing a latching engagement.

The first guide element fixed to the window pane may, in principle, be fixed in the region of a rear edge of the window pane relative to the connection direction, so that a physical guidance for the window pane provided via the second guide element on a rear side edge of the window pane, i.e. in the case of a front side pane in the vicinity of the B-pillar or in the case of a rear side pane in the vicinity of the C-pillar. Alternatively, the first guide element fixed to the window pane in the region of a front edge of the window pane relative to a connection direction may be fixed so that a physical guidance for the window pane is provided via the second guide element on a front side edge of the window pane, i.e. in the case of a front side pane in the vicinity of the A-pillar or in the case of a rear side pane in the vicinity of the B-pillar.

For the guidance of the window pane in the region of its opposing edge relative to the connection direction, in one variant a third guide element is provided, said third guide element being displaceably held on a fourth guide element on the window opening along the adjustment path of the window pane. In this case, a connecting portion is provided on the third or fourth guide element, said connecting portion extending in the same direction as the at least one latching portion of the first or second guide element. Thus, for example, the first and third guide elements fixed to the window pane are configured as so-called "pin guides" with portions extending in each case in the connection direction and which are preferably displaceably held in guide tracks of second and fourth guide elements fixed to the bodywork or fixed to the door. By the extent of the connecting portion and the latching portion in the same direction, firstly the assembly sequence is substantially predetermined since the window pane is only able to be assembled in the connection direction onto the respective window opening. Secondly, a permanent secure hold of the window pane may be relatively easily ensured on its lateral guides via a corresponding support of the window pane and/or the guide elements counter to the connection direction defined in this manner. As a result, a third guide element which is also fixed to the window pane may have a connecting portion which is displaceably held on a guide channel of a fourth guide element which is fixed to the door or fixed to the bodywork.

For the assembly of the window regulator assembly, in this case in one variant, the fourth guide element may be displaceable on a component fixed to the door or fixed to the bodywork parallel to the connection direction. In this variant, therefore, the window pane may be positioned on the window opening, wherein the first and second guide elements are then snapped together. Subsequently, a displacement of the fourth guide element takes place so that the connecting portion of the third guide element which is also fixed to the window pane only engages thereafter in the guide channel of the fourth guide element as intended. Firstly, the fourth guide element is initially located in an assembly position on the components fixed to the door or fixed to the bodywork, the window pane being able to be prepositioned in said position by snapping together the first and second guide elements and being aligned with the window opening. Only then is the fourth guide element displaced from the assembly position into a position of use, in which via the fourth guide element a physical guidance of the at least one third guide element is formed, and blocked in said position. For example, the window pane is snapped via its first guide element on a rear side edge relative to the vehicle longitudinal axis, into a guide on the B-pillar side (in the case of a front side pane), or a guide on the C-pillar side (in the case of a rear side pane) and subsequently held on its front side edge, in the region of the A-pillar (in the case of a front side pane) or B-pillar (in the case of a rear side pane) in a defined assembly position, until a fourth guide element on the A-pillar side or B-pillar side is displaced in the direction of the front side edge of the window pane in order to receive the connecting portion of the third guide element in a guide channel of the fourth guide element provided on the front side edge and to hold it displaceably thereon.

In one variant, the third and fourth guide elements are also able to be snapped together, for example via a resiliently displaceable latching portion of the third or fourth guide element. Similar to the above descriptions for snapping together the first and second guide elements, an additional securing element may be also provided in the third and fourth guide elements in order to secure a positive latching connection of the third and fourth guide elements.

Alternatively or additionally, a separate cover element which is able to be attached to a door part or bodywork part of the vehicle may be provided with a seal, wherein a side edge of the window pane bears against this seal and the window pane in the installed state as intended is supported by the cover element parallel to the connection direction. The cover element, which is preferably to be attached on a side of the bodywork or the vehicle door facing the vehicle interior, in this case acts, therefore, as a lateral support of the window pane on the window opening in order to prevent the window pane after its assembly from being able to be inadvertently displaced counter to the connection direction. Not only a release of the guide elements from one another is prevented thereby but also the production of any ratting noise. Via the cover element forming a cladding for a bodywork part or a door part, a positive engagement of a guide element into the respectively associated other guide element may be additionally ensured, by the cover element counteracting a displacement of the window pane and thus the first and third guide elements fixed thereto counter to the connection direction.

In one exemplary embodiment, the cover element is formed by a triangular mirror panel when the window pane is provided for closing a window opening on a front vehicle door. A triangular mirror panel in this case is generally attached in a region in the vicinity of the A-pillar of the vehicle. In this variant, therefore, in addition to its function as a cover further functions are integrated in such a triangular mirror panel. Thus the triangular mirror panel in this variant is also the carrier of a seal for the side edge of the window pane located in the window opening. Moreover, the triangular mirror panel functions as (additional) securing of the window pane parallel to the connection direction.

This functional integration into a cover element, in particular into a triangular mirror panel, may be advantageous namely in connection with the snapping together of the first and second guide elements provided according to the invention, but obviously is not limited thereto. Accordingly independently thereof, according to a further feature of the invention a window regulator assembly is proposed in which for the assembly of the window regulator assembly one of at least two guide elements is able to be connected to a different guide element in a connection direction extending substantially parallel to the plane of the pane, and a separate cover element which is able to be attached to a door part or bodywork part of the vehicle is provided with a seal, wherein a side edge of the window pane bears against this seal and the window pane in the installed state as intended is supported by the cover element counter to the connection direction.

Via the cover element, in this manner a retention of a guide element on the other guide element, in particular a positive engagement of a guide element in the other guide element, may be additionally ensured in the connection direction since the cover element blocks a displacement of the window pane and thus the guide element fixed thereto counter to the connection direction. Therefore, the window pane may not be displaced beyond the cover element counter to the connection direction.

Preferably, in this case a corresponding cover element is also formed by a triangular mirror panel which, therefore, also becomes the carrier of the seal for a front side edge of the window pane.

A further feature of the invention is a method for the assembly of a window regulator assembly, in particular a window regulator assembly designed according to the invention, wherein the window regulator assembly is provided for a vehicle window regulator, in which in a closed state the window pane to be adjusted is flush-mounted with the upper and/or lateral bodywork parts which border a window opening to be closed by the window pane.

According to the invention, it is provided that a first guide element fixed to the window pane in the region of a front or rear edge, or a second guide element, the first guide element being intended to be displaceably held thereon along the adjustment path of the window pane, comprises at least one resiliently displaceable latching portion. According to the invention, the first and second guide elements are snapped together for the assembly of the window regulator assembly in a connection direction extending transversely to the adjustment path and substantially parallel to the plane of the pane. The snapping together of the two guide elements in this case may take place in the region of the window opening—optionally however also below a window parapet and thus for example inside a door channel. It is essential that a positive connection of the first guide element fixed to the window pane and of the second guide element is provided via the at least one latching portion of a first or second guide element, said connection securing the first guide element to the second guide element relative to the connection direction. According to the invention, in this case it is further provided that a physical guidance of the window pane both in the connection direction and also in a transverse direction extending perpendicular thereto is provided by the first and second guide elements which are positively connected together as intended.

After the first and second guide elements have been snapped together as already explained above, a securing element which is configured as a separate component may be placed onto the at least one latching portion so that a positive connection of the first and second guide elements is ensured by the securing element.

The first guide element may be fixed to the window pane in the region of a rear (front) edge relative to the connection direction. A third guide element may then be fixed to the window pane in the region of a front (rear) edge of the window pane, and displaceably held on a fourth guide element on the window opening on the bodywork side or door side. A connecting portion provided therefor on the third guide element, via which the window pane is intended to be displaceably held on the fourth guide element on the window opening, in one exemplary embodiment is brought into engagement with the fourth guide element when the first and second guide elements have been snapped together, or the connecting portion is brought into engagement with the fourth guide element after the first and second guide elements have been snapped together.

In the first-mentioned case a cover element comprising a seal may be provided on a door or bodywork part of the vehicle for attachment only after the first and second guide elements and the third and fourth guide elements have been connected together. The subsequently attached cover element supports the window pane via its seal, by a side edge of the window pane bearing against the seal.

In one variant in which the third and fourth guide elements are brought into engagement with one another in the region of the front (rear) edge of the window pane, only after the first and second guide elements have been snapped together in the region of the rear (front) edge, is the fourth guide element on the bodywork side or door side displaceable for the assembly of the window regulator assembly. The fourth guide element in this case is displaceably held on a component fixed to the door or fixed to the bodywork parallel to the connection direction and is then—after placing and aligning the window pane on the window opening—displaced in or counter to the connection direction, so that the third guide element engages in the fourth guide element. The connection as intended between the third and fourth guide elements in this case is, therefore, only produced after the first and second guide elements have been snapped together and the window pane has been aligned in the window opening. In this manner, for example, a guide channel of the fourth guide element is pushed onto a connecting portion of the third guide element fixed to the window pane, by being displaced parallel to the connection direction and thus substantially transversely to its direction of extent, only after the window pane has been positioned on the window opening. Subsequently, the displaced fourth guide element is fixed in the adopted position, defining a position of use.

For the displaceability of the fourth guide element, in order to be able to displace this guide element during the assembly of the window regulator assembly from an assembly position into a position of use, for example, a slot is provided as a guide. In this case, for example, an element secured to the fourth guide element, for example a fastening element such as a screw, engages in a slot of a bodywork part or door part on which the fourth guide element is to be fixed—for example via this fastening element itself—or conversely an element secured to the bodywork part or door part engages in a slot of the fourth guide element.

In a further variant, the third and fourth guide elements are also snapped together after the first and second guide elements have been snapped together. In particular, in this variant it may also be provided that in the region of the front edge a cover element comprising a seal is already provided on a door part or bodywork part of the vehicle before connecting the third and fourth guide elements together, so that when the window pane is positioned as intended inside the window opening a front side edge of the window pane bears against the seal and the window pane is supported via the cover element parallel to the connection direction.

An assembly method according to the invention may be used in this case, in particular, for the assembly of a window regulator assembly designed according to the invention. As a result, the advantages and features provided above and below relative to variants of a window regulator assembly according to the invention also apply to variants of an assembly method according to the invention and vice-versa.

BRIEF DESCRIPTION OF THE DRAWINGS

Possible variants of the solution according to the invention are also illustrated with reference to the accompanying figures.

FIG. 1 shows in a detail and in a perspective view a first guide element fixed to a lateral edge of a window pane for snapping into a guide which is formed by a second guide element on the bodywork side or door side.

FIGS. 2A to 2B show sectional views of the guide elements positively connected together as intended.

FIG. 3 shows in a detail and in a perspective view a further variant for a first guide element fixed to the window pane with different latching and guide portions.

FIGS. 4A to 4C show sectional views of the guide element of FIG. 3 connected positively to a guide on the bodywork side or door side.

FIGS. 5A to 5D show a further variant of a first guide element fixed to a lateral edge of the window pane with the securing element placed longitudinally thereon in different views and phases during assembly.

FIGS. 6A to 6D show a variant of a first guide element fixed to a lateral edge of the window pane with the securing element placed transversely thereon in different views and phases during assembly.

FIGS. 7A to 7D show a further variant of a first guide element fixed to a lateral edge of the window pane with the securing element placed transversely thereon in different views and phases during assembly.

FIGS. 8A to 8B show in each case a sectional view of a front edge of a window pane, on which a further (third) guide element fixed to the window pan is brought into engagement with a front guide channel and is secured by a cover element in the form of a triangular mirror panel.

FIG. 9 shows in views coinciding with FIGS. 8A and 8B, an alternative variant with a separately fixed guide element on the door side.

FIGS. 10A to 10C show respectively in sectional view different phases during the assembly of a window pane of a further variant of a window regulator assembly according to the invention in which a front (fourth) guide element is displaceable parallel to the connection direction.

FIGS. 11A to 11B show respectively in sectional view different phases during the assembly of a further variant of a window regulator assembly according to the invention in which both the rear and the front guide elements are able to be snapped together.

FIGS. 12A to 12B show in side view a vehicle door, in which by using a window regulator assembly according to the invention a window pane which is flush-mounted in a closed state with upper and lateral bodywork parts may be inserted from above into a door channel and may be secured on lateral guides of a window frame is a connection direction facing to the rear.

DETAILED DESCRIPTION

FIGS. 12A and 12B show in side view a vehicle door T with a view of a door outer skin in the form of a door outer panel TAB. The vehicle door T defines via a window frame RF a window opening which may be closed and opened by a window pane FS which is adjustable along an adjustment path. The adjustment path of the window pane FS in the present case extends in a straight line and slightly inclined toward a vertical defined by the spatial direction z, when the window pane FS is arranged as intended on a vehicle.

In a closed state of the window pane, the window pane FS is flush-mounted relative to bodywork parts bordering the window opening at the top and/or side. In this connection, this is also referred to as a window regulator system for a flush-mount pane design or "flush glazing" or "pin guide" window regulator system. The flush-mounted arrangement of the closed window pane relative to the bodywork parts bordering the window opening at the top and/or side results in a particularly attractive design and the impression of a flat pane and bodywork side surface. In order to guide specifically the window pane FS on the window opening and to predetermine the adjustment path for the window pane FS, glide elements fixed to the window pane FS are provided. These guide elements are fixed, on the one hand, to a rear lateral edge Rh relative to the vehicle longitudinal axis and to a front edge Rv of the window pane FS and in each case displaceably guided in guide channels which are formed by guide elements fixed to the door, in FIGS. 12A and 12B only a rear guide 2 thereof being visible as second guide element.

Figure 8C:
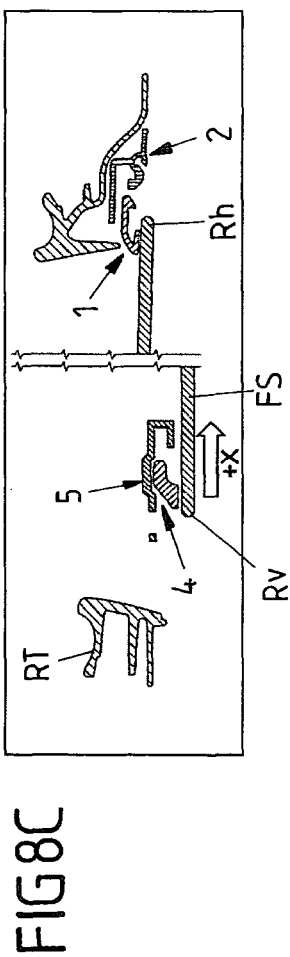
FIGS. 8C to 8E show in respective sectional views different phases during the assembly of a window regulator assembly according to FIGS. 8A and 8B with a view of a front and a rear edge of the window pane.
Figure 8D:
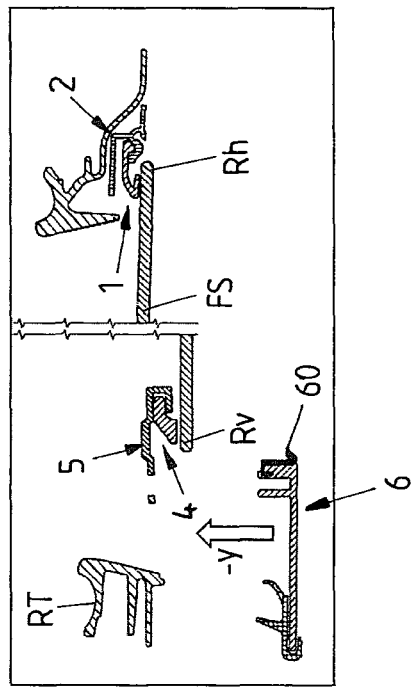
Figure 8E:
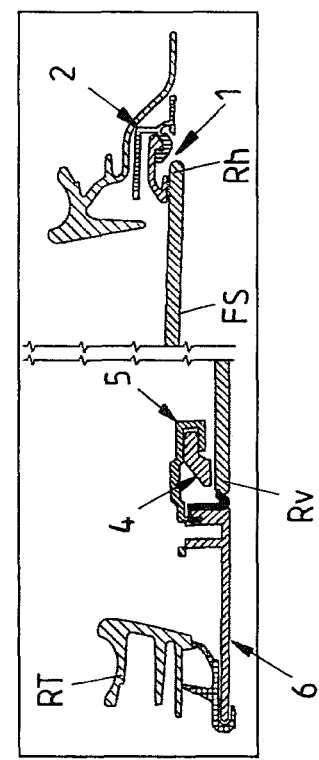

With reference to FIGS. 12A to 12B by way of example it is illustrated how by using a window regulator assembly designed according to the invention the window pane FS does not have to be placed from below, i.e. from below a window parapet, onto the vehicle door T, so that in particular the door outer panel TAB would then have to be designed to be removable. Instead, the window pane FS is placed from above onto the window opening and then displaced to the rear in the direction of the guide 2, in order to bring into positive engagement guide elements by snapping together, particularly on the rear edge Rh of the window pane FS. According to FIG. 12A, as a result, the window pane with its guide elements already fixed thereto is placed initially from above in the spatial direction −z onto the vehicle door T. Subsequently, the window pane FS in the region of the window opening is displaced in a connection direction x extending perpendicular thereto and facing to the rear, and as a result secured to the guide 2 provided by the window frame RF. FIGS. 1 to 11B described below illustrate different variants of a window regulator assembly for the assembly sequence illustrated with reference to FIGS. 12A and 12B, when attaching the window pane FS to the vehicle door T.

FIGS. 1 and 2A to 2B show a first exemplary embodiment of a window regulator assembly designed according to the invention, in which a first guide element on the pane side in the form of a rear pane guide element 1 is formed by two resiliently displaceable latching portions 10a and 10b and a guide portion 11 arranged between these latching portions 10a and 10b. The latching portions 10a and 10b which are configured in the manner of latching tabs or latching arms and the guide portion 11 in each case protrude in an L-shaped manner from a base 1a on an inner face of the guide rail FS. Via this base 1a the latching portions 10a and 10b and the guide portion 11 are fixed in the region of the rear edge Rh of the window pane FS. The latching portions 10a and 10b and the guide portion 11 in this case are configured integrally with the base 1a and the base 1a is, for example, bonded to the window pane FS.

The latching portions 10a and 10b in each case are designed to be resiliently displaceable on the base 1a of the pane guide element 1, so that the latching portions 10a and 10b are displaceable resiliently relative to the window pane FS, perpendicular to the connection direction x and thus in the present case perpendicular to a plane of the pane spanned by the window pane FS, i.e. parallel to a transverse direction y. In this manner, latching hooks 100 provided on the latching portions 10a and 10b are snapped into a guide channel 20 of the rear guide 2 of the window frame RF when the window pane FS with the pane guide element 1 is displaced in the connection direction x in the direction of the rear guide 2. The latching hooks 100 in this case protrude in each case in the transverse direction y over the latching portions 10a and 10b. Additionally the ends of the latching portions 10a and 10b forming the latching hooks 100 extend beyond the rear side edge of the window pane FS.

The guide channel 20 of the rear guide 2 has two opposing wall portions 21a and 21b in the transverse direction y, the ends of the latching portions 10a and 10b and the end of the guide portion 11 being received therebetween when the rear pane guide element 1 is connected as intended to the rear guide 2. A wall portion 21a forms an edge protruding in the −y direction in the manner of a projection, which is engaged from behind by a latching hook 10a, 10b corresponding to the sectional view of FIG. 2A, when the rear pane guide element 1 with its latching portions 10a and 10b has been inserted as intended into the guide channel 20 and the respective latching hook 100 has been snapped in. By the latching hook 100 engaging behind the wall portion 21b a latching portion 10a or 10b in each case forms a positive connection between the rear pane guide element 1 and the rear guide 2, via which the pane guide element 1 and thus the window pane FS connected fixedly thereto is secured relative to the connection direction x on the guide 2.

Via the pane guide element 1, however, a securing not only takes place relative to the connection direction x but also transversely thereto in the transverse direction y. Thus the guide portion 11, which is arranged centrally between the two latching portions 10a and 10b and protrudes in the manner of a pin, is also inserted into the guide channel 20. In this case the guide portion 11 in cross section (in the direction) is designed to be thicker than the latching portion 10a or 10b so that the guide portion 11 is substantially received without clearance between the two wall portions 21a and 21b. Via the guide portion 11, therefore, a physical guidance of the window pane FS on the rear guide 2 relative to the transverse direction y is provided when the rear pane guide element 1 is snapped into the guide channel 20. If, as a result, the pane guide element 1 and the guide 2 are snapped together, the window pane FS on its rear edge Rh is not only held displaceably on the guide 2 but also secured thereto in a defined manner relative to the connection direction x and the transverse direction y. In this case, the latching portions 10a and 10b undertake the guidance in the connection direction x and the guide portion 11 undertakes the guidance in the transverse direction y. A "pin guide" defined by the rear pane guide element 1 may, therefore, be easily snapped into the guide 2 of the vehicle door on the door side in the vicinity of the B-pillar and after being snapped in is displaceably held thereon along the guide 2 and physically guided relative to two spatial directions x and y perpendicular to one another.

FIGS. 3 and 4A to 4C illustrate a further exemplary embodiment of a window regulator assembly according to the invention, in which a rear pane guide element 1 comprises a plurality or latching portions 10a to 10d with differently oriented latching hooks 100 [and] an individual guide portion 11 arranged centrally between the latching portions 10a to 10d. The latching portions 10a to 10d and the guide portion 11 are arranged one above the other as in the variant of FIGS. 1 and 2A to 2B in a longitudinal direction z (relative to the positioning of the window pane as intended in the window opening of the vehicle door T). In the perspective view of FIG. 3, with a view of the inner face of the window pane FS, therefore, the individual latching portions 10a to 10d and the guide portion 11 are located along the rear edge Rh of the window pane FS adjacent to one another.

In this case the respective outer latching portions 10c and 10d in each case have a latching hook 100 protruding away from the inner face of the window pane FS in the direction −y, and the internal latching portions 10a and 10b adjacent to the guide portion 11 in each case have a latching hook 100 protruding in an opposing direction y. Via the two different types of latching portions 10a, 10b and 10c, 10d, therefore, an alternate latching engagement is possible in opposing wall portions 21a and 21b of the guide 2 on the door side.

As illustrated with reference to the sectional views of FIGS. 4B and 4C, the guide 2 on the wall portions 21a and 21b of the guide channel 2 forms edges protruding in the manner of projections toward one another. When the pane guide element 1 and the guide 2 are snapped together, and thus in the present case the rear pane guide element 1 is snapped into the guide 2, one edge is engaged behind by the one type of latching portion 10a, 10b, whilst the other opposing edge is engaged behind by the other type of latching portion 10c, 10d. The edges of the wall portions 21a and 21b protruding in the manner of projections extend in this case (and the edge on the wall portion 21b of the variant of FIGS. 1 and 2A to 2B) continuously on the guide 2 in the longitudinal direction z so that the latching portions 10a to 10d are correspondingly physically guided thereby over the entire permitted adjustment path of the window pane FS on the window opening.

A guidance in the connection direction x is provided in this case by the two rows of latching portions 10a to 10d, separated from one another via the centrally arranged guide portion 11, said latching portions having the alternately protruding latching hooks 100. The guide portion 11 which is centrally arranged between the two pairs of latching portions 10a, 10c and 10b, 10d in this variant is provided in turn for the physical guidance relative to the transverse direction y. To this end, the guide portion 11 is received without clearance between the edges of the wall portions 21a and 21b protruding toward one another in the manner of projections.

Moreover, the guide portion 11 on a front face located in the connection direction x has a resilient region which is formed by a spring arc 110. Via this spring arc 110 the guide portion 11 is resiliently supported on a base of the guide channel 20 located in the connection direction x, when the rear pane guide element 1 as intended is positively latched via its latching portions 10a to 10d on the guide 2. The compressed spring arc 110 then exerts a pretensioning force acting counter to the connection direction X, so that the latching hooks 100 of the latching portions 10a to 10d are pressed against the protruding edges of the wall portions 21a and 21b of the guide 2. In this manner, on the one hand, a certain resilience is provided in the connection direction x, in order to be able to compensate, in particular, for production tolerances and to align the window pane FS as intended parallel to the connection direction x relative to the guide 2. On the other hand, via the pretensioning force produced by the spring arc 110 the positive engagement of the latching hooks 100 of the latching portions 10a to 10d in the guide channel 20 is assisted so that the rear pane guide element 1 once snapped into the guide 2 is not able to spring out easily again from the guide 2 and additionally rattling noise due to the latching hooks 100 striking against the wall portions 21a, 21b is avoided.

Via latching portions with latching hooks 100 protruding alternately in opposing directions, a guide for the window pane FS may also be provided in the transverse direction y. This is utilized in the variant of FIGS. 5A to 5D which manages without a non-latching guide portion 11 in the guide channel 20 of the guide 2 on the door side.

In this variant, the rear pane guide element 1 is defined by a plurality of latching portions 10a to 10e arranged one above the other in the longitudinal direction Z. This rear pane guide element 1 is in this case also snapped into the guide channel 20 of the guide 2. After snapping the pane guide element 1 and the guide 2 together, the positive latching connection is secured via an elongated securing element 3. This elongated securing element is placed onto the latching portions 10a to 10e by a pin body 30 parallel to the longitudinal direction (in the direction −z) so that the elongated securing element 3 supports the latching portions 10a to 10e against one another, said latching portions being offset to one another alternately relative to the transverse direction y. Thus on the rear pane guide element 1 the latching portions 10a to 10e are arranged alternately with one another, with latching hooks 100 protruding in two opposing directions y and −y, so that each (first) latching portion 10a, 10b or 10e of a first type with a latching hook 100 protruding in the transverse direction y is adjacent to at least one (second) latching portion 10c, 10d of a second type, which forms a latching hook 100 protruding in the opposing transverse direction By the securing element 3 being placed into the guide channel 20 of the guide 2 between the latching portions 10a to 10e, after the rear pane guide element 1 has been snapped in, so that the latching portions 10a, 10b and 10e of the first type are arranged on a longitudinal side of the securing element 3, and the latching portions 10c and 10d of the second type are arranged on the other longitudinal side of the securing element 3, the individual latching portions 10a to 10e in each case are secured against being brought out of engagement with the associated wall portion 21a or 21b of the guide 2.

In this case, in order to assist the support of the latching arms 10a to 10e relative to one another via the securing element 3, the pin body 30 of the securing element 3 is formed with portions alternately offset relative to one another transversely to its longitudinal direction of extent. A portion offset in the y direction is then supported after attaching the securing element 3 as intended on a latching portion 10a, 10b or 10e with latching hooks 100 protruding in this y direction, whilst a portion of the pin body 30 offset in the −y direction is supported on a latching portion 10c or 10d with latching hooks 100 protruding in this −y direction.

In order to hold securely the securing element 3 in an adopted locked position according to FIG. 5D, in which all latching portions 10a to 10e are supported against one another as intended, latching means are provided. Via these latching means the securing element 3 is positively latched to the latching portions 10a to 10e when it is placed onto the latching portions 10a to 10e as intended. To this end, the securing element 3 on its pin body 30 has a plurality of latching lugs 300 and 301 on two opposing longitudinal sides. These latching lugs 300 and 301 positively engage in latching recesses 101 on the latching portions 10a to 10e. The latching recesses 101 in this case are provided in each case on a latching portion 10a to 10e on a rear face of the respective latching portion 10a to 10e remote from an associated latching hook 100.

In the variant of FIGS. 6A to 6D, an individual securing element 3 is also provided in order to secure a plurality of latching portions 10a to 10b of a rear pane guide element 1 on the guide 2 after the snapping thereof into the guide channel 20 of the rear guide 2. The rear pane guide element 1 in this case is formed with a series of latching elements 10 extending along the rear edge Rh of the window pane FS, wherein each latching element has a pair of latching portions 10a, 10b. Each pair of latching portions 10a, 10b is integrally formed with a common base 1a and has two latching portions 10a and 10b, spaced apart from one another and opposing one another in the connection direction x, which are able to be displaced in each case in a resilient manner. The latching portions 10a and 10b of a latching element 10 are thus located one behind the other in the transverse direction y on the inner face of the window pane FS. In this manner a pair of latching portions 10a, 10b positively engages in the guide channel 20 with latching hooks 100a, 100b protruding in opposing directions y and −y and at the same time engages behind two exactly opposing protruding edges of the wall portions 21a and 21b of the guide channel 20.

An insertion opening 102 is provided on each pair of latching portions 10a, 10b of the total of five latching elements 10 arranged one behind the other in series, a securing pin 310 of the securing element 3 being able to be inserted into said insertion opening. In this case a securing pin 310, which is inserted in the connection direction x into an insertion opening 102, is pressed between the two latching portions 10a and 10b of a latching element 10 and thus a latching element 10 is (further) spread apart by an inserted securing pin 310 or at least held in a spread-apart state, in which the two latching portions 10a, 10b of a latching element 10 are spaced apart from one another in a defined manner. In this manner, the latching engagement of a latching element 10 in the guide channel 20 of the rear guide 2 is secured via an inserted securing pin 310, so that the rear pane guide element 1 may not be brought out of engagement with the rear guide 2 without removing the securing element 3.

Via the latching element 10 which is spread apart in each case by means of the securing element 3, a physical guidance in the transverse direction y extending perpendicular to the connection direction x is also provided. To this end, the latching portions 10a and 10b arranged one behind the other in this transverse direction y slidingly bear against the opposing edges of the wall portions 21a and 21b of the guide 2 protruding in the manner of projections, the respective latching hooks 100a and 100b engaging behind said wall portions.

The securing element 3 in this case has a plurality of securing pins 310 extending parallel to one another for the latching elements 10 arranged in series. The securing pins 310 in this case protrude on an elongated pin strip 31 of the securing element 3. By simultaneous insertion of the securing pins 310 of the securing element 3 into the insertion openings 102 of the latching elements 10, via an individual securing element 3 a plurality of latching elements 10 may be secured by a plurality of latching portions 10a, 10b arranged in pairs in their engagement in the guide channel 20.

In the variant of FIGS. 7A to 7D, similarly provided is an individual securing element 3 with a pin strip 31 and securing pins 310 extending parallel to one another thereon. Firstly in the variant of FIGS. 7A to 7D, however, the securing pins 310 are not configured to be circular-cylindrical—as in the variant of FIGS. 6A to 6D—but configured to be rectangular in cross section. Secondly, the rear pane guide element 1 in this case has a plurality of latching portions 10a arranged in a series one behind the other, the latching hooks 100 thereof protruding in the same transverse direction −y and thereby engaging behind the same projection-like edge of a wall portion 21a of the rear guide 2 when the pane guide element 1 is snapped into the guide 2. Via the individual latching portions 10a in this case a securing of the rear pane guide element to the rear guide 2 is thus provided relative to the connection direction x.

A guidance perpendicular thereto in the transverse direction y is provided by placing the securing element 3 onto the rear pane guide element 1. Thus the securing pins 310 of the securing element 3 are inserted via insertion openings 102 formed as through-openings into a gap which is present between a latching portion 10a and an edge of the wall portion 21b of the guide channel 20 which is not engaged behind by the latching hook 100 of this latching portion 10a. The securing pin 310 inserted into this gap and preferably received therein without clearance thus ensures in cooperation with the latching portion 10a the physical rattle-free guidance of the rear pane guide element 1 on the rear guide 2 on the bodywork side or door side, by the latching portion 10a bearing slidingly against the edge of the one wall portion 21a of the guide 2, engaged from behind by its latching hook 100 in the manner of a projection, and the inserted securing pin 310 of the securing element 3 bearing against an opposing edge of the other wall portion 21b protruding in the manner of a projection in the y direction.

In order to guide the window pane FS displaceably on its front edge Rv on the window opening, the window pane FS is provided with a third guide element in the form of a front pane guide element 4. This front pane guide element 4, similar to the rear pane guide element 1, is fixed to an inner face of the window pane FS, for example by means of bonding, and has a portion protruding in the manner of a finger in the connection direction x. This portion in the present case is denoted as a connecting portion 40. By the connecting portion 40 protruding in the connection direction x and spaced apart from the inner face of the window pane FS, the front pane guide element 4 also has in cross section a substantially L-shaped design.

In one variant, as illustrated in more detail with reference to FIGS. 8A to 8B and 8C to 8E, after assembly when the window pane FS is positioned as intended, the connecting portion 40 engages in a guide channel 50, which is U-shaped in cross section, of a fourth guide element fixed to the bodywork or fixed to the door in the form of a front guide 5. The guide channel 50 of the front guide 5 in this case—as in the case of the guide channel 20 of the rear guide 2—is also open in a direction counter to the connection direction x. In this manner, the connecting portion 40 extending in the connection direction x, and a latching portion 10a to 10e or a guide portion 11 of the rear pane guide element 1, may be brought into positive engagement with its associated guide 5 in the connection direction x. The connecting portion 40 in this case, therefore, protrudes to the rear and from the inner face of the window pane FS. In this case, the front pane guide element 4 does not protrude over a front side edge of the window pane FS.

During assembly, the window pane FS is placed from above the window parapet (in the −z direction) onto the window opening of the vehicle door and brought into an assembly position on the window openings. By displacing the window pane in the connection direction x (in the subsequent vehicle longitudinal axis) to the rear, the at least one pane guide element 1 is latched onto the rear guide 2. Simultaneously, according to the views of FIGS. 8C to 8B, the front pane guide element 4 is inserted into the front guide profile and/or the front guide 5, since both pane guide elements 1 and 4 with their portions 10a to 10e, 11 and 40 to be inserted into the respective associated guide channel 20 or 50, face in the same direction, the connection direction x.

Subsequently, a cover element in the form of a triangular mirror panel 6 is assembled and fixed to the door shell which in the present case is symbolized by a frame part RT of the vehicle door T. The triangular mirror panel 6, which is attached in a region of the vehicle door in the vicinity of the A-pillar, supports in the present case the window pane FS positioned as intended, parallel to the connection direction x (and counter thereto) via a seal 60 held on the triangular mirror panel 6. A front side edge of the window pane FS thus bears against the seal 60 and is supported via the triangular mirror panel 6 counter to the connection direction x, so that a displacement of the window pane FS, with the front and rear pane guide elements 1 and 4 fixed thereto, is blocked thereby counter to the connection direction x. The triangular mirror panel 6 which is assembled retrospectively in toe region of the front pane guide 5, thus on the one hand functions as a carrier of the pane seal 60 for the front pane edge of the window pane FS and as additional securing of the window pane FS in the x direction. The triangular mirror panel 6 in this case is attached to the door shell and fixed thereto in the transverse direction −y corresponding to FIG. 8D.

As illustrated with reference to the cross-sectional view of FIG. 9, it is not obligatory that the front guide 5 is configured as a guide profile integrated in the window frame RF. The front guide 5 may also be configured as a separate component and fixed to a door part TT (or alternatively to a bodywork part) by at least one fastening element BE, for example a screw or a rivet.

In the variant shown in FIGS. 10A to 10C, the triangular mirror panel 6 is already secured to the door shell before the connection of the front pane guide element 4 to its associated front guide 5. In order to bring the front guide 5 and the front pane guide element 4 as intended into engagement with one another, in this case the front guide 5 is displaceably held on a door part TT fixed to the door, in a direction −x extending counter to the connection direction x. To this end, a longitudinal guidance of the front guide 5 is provided via a slot L. A fastening element BE fixed to the front guide 5 in this case is displaceably held in the slot L for the assembly of the window regulator assembly.

During assembly, the window pane FS is initially snapped into the rear guide 2 via its rear pane guide element 1. Subsequently, the window pane FS on its front edge Rv is pivoted relative to the rear guide 2 and in the transverse direction −y in the direction of the guide 5. According to FIG. 10A the guide 5 in this case is held in an assembly position displaced to the rear, in particular when attaching and aligning the window pane FS in the window opening.

If the window pane FS is then in an aligned position corresponding to FIG. 10B, in which the front side edge of the window pane FS already bears against the seal 60 of the triangular mirror panel 6 and is supported thereby, the front guide 5 is displaced to the front in the direction −x counter to the connection direction x into a position of use. As a result, the guide channel 50 of the front guide 5 is pushed over the connecting portion 40 of the front pane guide element 4 protruding in the connection direction x, so that the connecting portion 40 is received positively in the guide channel 50 and displaceably held therein.

If the front guide 5 has adopted a position of use corresponding to FIG. 10C, via the displacement along the slot L to the front, this position of the front guide 5 is fixed via the fastening element BE from an inner face of the vehicle door T. The fastening element BE in this case engages in a bearing portion 51 of the front guide 5, via which for assembly the front guide 5 is also displaceably held on the door part TT between the assembly position and the position of use.

In the further variant of a window regulator assembly according to the invention, illustrated by the sectional views of FIGS. 11A and 11B, a front pane guide element 4 which in the region of the front edge Rv of the window pane FS is fixed thereto, is also provided with a latching hook 400. In this case, the connecting portion 40 forms a latching portion extending in the transverse direction −y, with a latching hook 400 protruding counter to the connection direction x. Moreover, an engagement edge 52 corresponding to the latching hook 400 is formed on the front guide 5, the latching hook 400 of the front pane guide element 4 being able to be snapped therein and the pane guide element 4 being displaceably held thereon.

As illustrated with reference to FIGS. 11A and 11B, in this case initially the rear pane guide element 1 is snapped into the rear guide 2 in the connection direction x and thereby the rear pane guide element 1 and the rear guide 2 are snapped together. Subsequently, the window pane FS with its front edge Rv is pivoted about the rear guide 2 in the transverse direction −y toward the front guide 5 in the vicinity of the A-pillar. As a result, the latching hook 400 comes into contact with the engagement edge 52 of the guide 5, is resiliently displaced in the connection direction x and then snaps onto the engagement edge 52 when the window pane FS is positioned as intended in the window opening.

Also in this variant, the triangular mirror panel 6 may be already fixed to the door shell, preferably by means of a screw, even before the connection of the front pane guide element 4 to its associated front guide 5.

In order to secure the window pane FS further, said window pane being displaceably held on its front and rear edges Rv and Rh only by snap connections in the associated guides 2 and 5 on the window opening, a securing element 7 shown schematically in FIG. 11B is provided. Via this securing element 7 which is inserted or screwed parallel to the transverse direction y and preferably in the transverse direction y, the latching connection between the front guide 5 and the front pane guide element 4 is secured. To this end, the securing element 7 is supported, for example, on a component fixed to the bodywork or fixed to the door and engages behind the latching hook 400 of the front pane guide element 4 so that this latching hook is not able to be brought out of engagement with the engagement edge 52 without removing the securing element 7.

Via the exemplary embodiments shown in the present case of a window regulator assembly according to the invention and an assembly method described in this connection, in a window regulator for a flush-mount pane design a window pane FS with front and rear pane guide elements 1 and 4 fixed thereto may be assembled in a relatively simple and rapid manner from above a window parapet, wherein at least one of the connections to a guide on the edge side on the window opening is provided via a snap connection, in the present case the connection of the rear pane guide element 1 to the rear guide 2 on the bodywork side or door side in the vicinity of the B-pillar. In this manner the assembly of a window pane FS, which in its closed position terminates flush-mounted with bodywork parts bordering the window opening, is also possible on a vehicle door T which does not have a removable door outer skin. Instead, the installation of the window pane FS for a so-called "flush glass" or "flush glazing" window regulator system is also possible for a vehicle door T which is produced according to a conventional two-shell door design.

LIST OF REFERENCE NUMERALS

1 Rear pane guide element (first guide element)
100, 100a, 100b Latching hook
101 Latching recess
102 Insertion opening 10a-10e Latching portion
11 Guide portion
110 Spring arc (resilient region)
1a Base
2 Rear guide (second guide element)
20 Guide channel
21a, 21b Wall portion (optionally with edge protruding in the manner of a projection in the y direction)
3 Securing element
30 Pin body
300, 301 Latching lug
31 Pin strip
310 Securing pin
4 Front pane guide element (third guide element)
40 Connecting portion
400 Latching hook
5 Front guide (fourth guide element)
50 Guide channel
51 Bearing portion
52 Engagement edge
6 Triangular mirror panel (cover element)
60 Seal
7 Securing element
BE Fastening element
FS Window pane
L Slot
RF Window frame
Rh Rear edge
RT Frame part
Rv Front edge
T Vehicle door
TAB Door outer skin
TT Door part

The invention claimed is:

1. A window regulator assembly comprising:
a window pane which is adjustable along an adjustment path and which extends along a plane, wherein the window pane in a closed state is flush-mounted relative to at least one of upper and lateral bodywork parts which border a window opening configured to be closed by the window pane;
at least one first guide element which is fixed to the window pane in a region of a lateral edge of the window pane; and
at least one second guide element on which the first guide element is displaceably held along the adjustment path of the window pane,
wherein the at least one first guide element or the at least one second guide element comprises at least one resiliently displaceable latching portion which enables the at least one first guide element and the at least one second guide element to be snapped together in a connection direction extending transversely to the adjustment path and parallel to the plane of the window pane, wherein a positive connection of the at least one first guide element, which is fixed to the window pane, and of the at least one second guide element is provided via the at least one latching portion, said positive connection securing the at least one first guide element to the at least one second guide element relative to the connection direction which extends parallel to the plane of the window pane, and
wherein a physical guidance of the window pane is provided both in the connection direction and in a transverse direction extending perpendicular to the connection direction via the at least one first guide element and the at least one second guide element, which are positively connected together.

2. The window regulator assembly as claimed in claim 1, wherein latching portion forms at least one latching hook which engages behind a wall portion of a guide channel when the at least one first guide element and the at least one second guide element are snapped together.

3. The window regulator assembly as claimed in claim 2, wherein at least two latching portions are provided on a at least one first or second guide element, a first latching portion thereof forming a latching hook which protrudes in a first direction and a second latching portion thereof forming a latching hook which protrudes in a second direction opposing the first direction.

4. The window regulator assembly as claimed in claim 3, wherein a first and second latching portion of the at least two latching portions are arranged one behind another in a longitudinal direction extending perpendicular to the connection direction and substantially parallel to the plane of the window pane or a first and second latching portion of the at least two latching portions are arranged one behind the other in the transverse direction.

5. The window regulator assembly as claimed in claim 1, wherein the at least one first guide element or the at least one second guide element has at least one rigid guide portion which protrudes substantially parallel to the connection direction and which, after the at least one first guide element and the at least one second guide element have been snapped together, provides a further positive connection between the at least one first guide element and the at least one second guide element, said positive connection securing the at least one first guide element to the at least one second guide element relative to the transverse direction.

6. The window regulator assembly as claimed in claim 5, wherein a latching portion and a guide portion are spaced apart from one another in a longitudinal direction extending perpendicular to the connection direction and substantially parallel to the plane of the window pane.

7. The window regulator assembly as claimed in claim 1, wherein a resilient region is provided on one of the at least one first guide element and the at least one second guide element, and via the resilient region the guide element of the at least one first guide element and the at least one second guide element comprising the at least one latching portion being pretensioned relative to the other guide element counter to the connection direction when the at least one first guide element and the at least one second guide element are snapped together.

8. The window regulator assembly as claimed in claim 7, wherein the at least one first guide element or the at least one second guide element has at least one rigid guide portion which protrudes substantially parallel to the connection direction and which, after the at least one first guide element and the at least one second guide element have been snapped together, provides a further positive connection between the at least one first guide element and the at least one second guide element, said positive connection securing the at least one first guide element to the at least one second guide element relative to the transverse direction, and wherein the resilient region is provided on the guide portion.

9. The window regulator assembly as claimed in 8, wherein the resilient region is configured as a spring arc on a front face of the guide portion located in the connection direction.

10. The window regulator assembly as claimed in claim 1, wherein at least one securing element which is placed onto the at least one latching portion is provided to thereby ensure a positive connection of the at least one first guide element and the at least one second guide element.

11. The window regulator assembly as claimed in claim 10, wherein the securing element is placed onto the at least one latching portion for ensuring the positive connection perpendicular or parallel to the connection direction.

12. The window regulator assembly as claimed in claim 10, wherein, via the securing element placed onto the latching portion, a latching hook of the latching portion of the one guide element is prevented from being able to be brought out of engagement with a wall portion of the other guide element.

13. The window regulator assembly as claimed in claim 10, wherein at least one part of the securing element is inserted into an insertion opening provided on the latching portion.

14. The window regulator assembly as claimed in claim 10, wherein a plurality of latching portions are provided spaced apart from one another and wherein a single securing element which is placed on a plurality of latching portions is provided.

15. The window regulator assembly as claimed in claim 1, wherein
   (a) the at least one first guide element is fixed to the window pane in a region of a rear edge of the window pane relative to the connection direction, and a third guide element is fixed to the window pane in a region of a front edge of the window pane
   or
   (b) the at least one first guide element is fixed to the window pane in a region of a front edge of the window pane relative to the connection direction and a third guide element is fixed to the window pane in a region of a rear edge of the window pane,
   wherein the third guide element is displaceably held on a fourth guide element on the window opening along the adjustment path of the window pane and wherein a connecting portion is provided on the third or fourth guide element, said connecting portion extending in the same direction in which the at least one latching portion extends.

16. The window regulator assembly as claimed in claim 15, wherein the third guide element fixed to the window pane comprises the connecting portion and the connecting portion is displaceably held on a guide channel of the fourth guide element, wherein the fourth guide element is displaceable in the connection direction for the assembly of the window regulator assembly on a component fixed to a vehicle door or fixed to a bodywork.

17. The window regulator assembly as claimed in claim 15, wherein a separate cover element, which is able to be attached to a door part or bodywork part of a vehicle, is provided with a seal and wherein a side edge of the window pane bears against the seal, wherein the window pane, when installed as intended, is supported by the cover element parallel to the connection direction.

18. The window regulator assembly as claimed in claim 17, wherein the window pane is provided for closing a window opening on a vehicle door of a vehicle and wherein the cover element is formed by a triangular mirror panel which is attached in a region close to an A-pillar of the vehicle.

19. A window regulator assembly comprising:
   a window pane for a vehicle window regulator which is displaceable along an adjustment path and extends along a plane, in which the window pane in a closed state is flush-mounted relative to at least one of upper and lateral bodywork parts which border a window opening configured to be closed by the window pane;
   at least one first guide element which is fixed to the window pane in a region of a lateral edge of the window pane; and
   at least one second different guide element, the at least one first guide element being displaceably held thereon along the displacement path of the window pane on the window opening, wherein
   for assembling the window regulator assembly, one of the at least one first guide element and the at least one second guide element is able to be connected to another one of the at least one first guide element and the at least one second guide element in a connection direction extending substantially parallel to the plane of the window pane, and
   a separate cover element which is able to be attached to a door part or bodywork part of a vehicle is provided with a seal, wherein a side edge of the window pane bears against the seal, and wherein the window pane, when installed as intended, is supported by the cover element counter to the connection direction.

20. A method for the assembly of a window regulator assembly comprising:
   a window pane which is adjustable along an adjustment path and which extends along a plane wherein the window pane, in a closed state is flush-mounted relative to at least one of upper and lateral bodywork parts which border a window opening to be closed by the window pane
   at least one first guide element which is fixed to the window pane in a region of a front or rear lateral edge of the window panel; and
   at least one second guide element, the first guide element being intended to be displaceably held thereon along the adjustment path of the window pane;
   the at least one first guide element or the at least one second guide element comprising at least one resiliently displaceable latching portion; the method comprising:
   snapping together the at least one first guide element and the at least one second guide element in a connection direction extending transversely to the adjustment path and parallel to the plane of the window pane, wherein a positive connection of the at least one first guide element which is fixed to the window pane and of the at least one second guide element is provided by the at least one latching portion, said connection securing the at least one first guide element to the at least one second guide element relative to the connection direction,
   wherein a physical guidance of the window pane both in the connection direction and in a transverse direction extending perpendicular thereto is provided by the at least one first guide element and the at least one second guide element positively connected together as intended.

21. A window regulator assembly comprising:
   a window pane which is adjustable along an adjustment path and which extends along a plane, wherein the window pane in a closed state is flush-mounted relative to at least one of upper and lateral bodywork parts which border a window opening configured to be closed by the window pane;
   at least one first guide element which is fixed to the window pane in a region of a lateral edge of the window pane; and at least one second guide element on which the at least one first guide element is displaceably held along the adjustment path of the window pane, wherein the at least one first guide element or the at least one second guide element comprises at least one resiliently displaceable latching portion which enables the at least one first guide element and the at least one second guide element to be snapped together in a connection direction extending transversely to the adjustment path and parallel to the plane of the window pane, wherein a positive connection of the at least one first guide element which is fixed to the window pane and of the at least one second guide element is provided via the at least one latching portion, said connection securing the at least one first guide element to the at least one second guide element relative to the connection direction which extends parallel to the plane of the window pane, and wherein a physical guidance of the window pane is provided both in the connection direction and in a transverse direction extending perpendicular to the connection direction via the at least one first guide element and the at least one second guide element which are positively connected together, and wherein a plurality of latching portions are provided spaced apart from one another and wherein a single securing element, which is placed on the plurality of latching portions is provided.

22. A window regulator assembly comprising:

a window pane which is adjustable along an adjustment path and which extends along a plane, wherein the window pane in a closed state is flush-mounted relative to at least one of upper and lateral bodywork parts which border a window opening configured to be closed by the window pane;

at least one first guide element which is fixed to the window pane in a region of a lateral edge of the window pane; and at least one second guide element on which the at least one first guide element is displaceably held along the adjustment path of the window pane, wherein the at least one first guide element or the at least one second guide element comprises at least one resiliently displaceable latching portion which enables the at least one first guide element and the at least one second guide element to be snapped together in a connection direction extending transversely to the adjustment path and parallel to the plane of the window pane, wherein a positive connection of the at least one first guide element which is fixed to the window pane and of the at least one second guide element is provided via the at least one latching portion, said positive connection securing the at least one first guide element to the at least one second guide element relative to the connection direction which extends parallel to the plane of the window pane, and wherein a physical guidance of the window pane is provided both in the connection direction and in a transverse direction extending perpendicular to the connection direction via the at least one first guide element and the at least one second guide element, which are positively connected together, and wherein (a) the at least one first guide element is fixed to the window pane in a region of a rear edge of the window pane relative to the connection direction, and a third guide element is fixed to the window pane in a region of a front edge of the window pane or (b) the at least one first guide element is fixed to the window pane in a region of a front edge of the window pane relative to the connection direction and a third guide element is fixed to the window pane in a region of a rear edge of the window pane, wherein the third guide element is displaceably held on a fourth guide element on the window opening along the adjustment path of the window pane and to this end a connecting portion is provided on the third or fourth guide element, said connecting portion extending in the direction the at least one latching portion extends.

* * * * *

UNITED STATES PATENT AND TRADEMARK OFFICE
CERTIFICATE OF CORRECTION

PATENT NO. : 10,787,851 B2  
APPLICATION NO. : 15/774987  
DATED : September 29, 2020  
INVENTOR(S) : Ian Freymuth et al.

Page 1 of 1

It is certified that error appears in the above-identified patent and that said Letters Patent is hereby corrected as shown below:

In the Claims

Column 21, Line 40, Claim 15     delete "same direction" and insert -- direction --

Column 22, Line 16 approx., Claim 19     after "extending" delete "substantially"

Column 22, Line 27, Claim 20     after "plane" insert -- , --

Column 22, Line 34, Claim 20     delete "panel;" and insert -- pane; --

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*